G. WEISS.
GREEN CORN HUSKING MACHINE.
APPLICATION FILED DEC. 21, 1906.
1,055,957.
Patented Mar. 11, 1913.
12 SHEETS—SHEET 2.
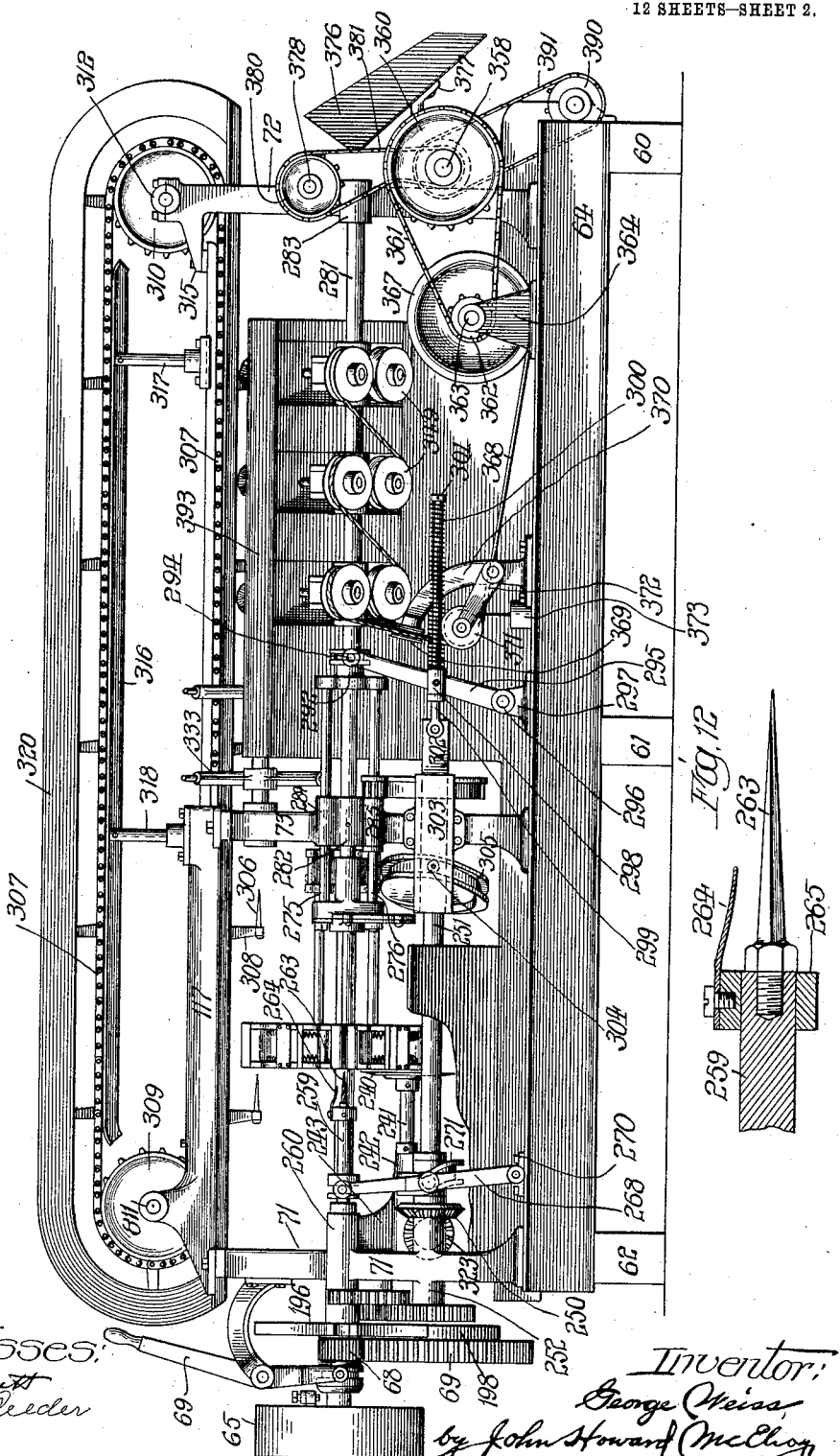

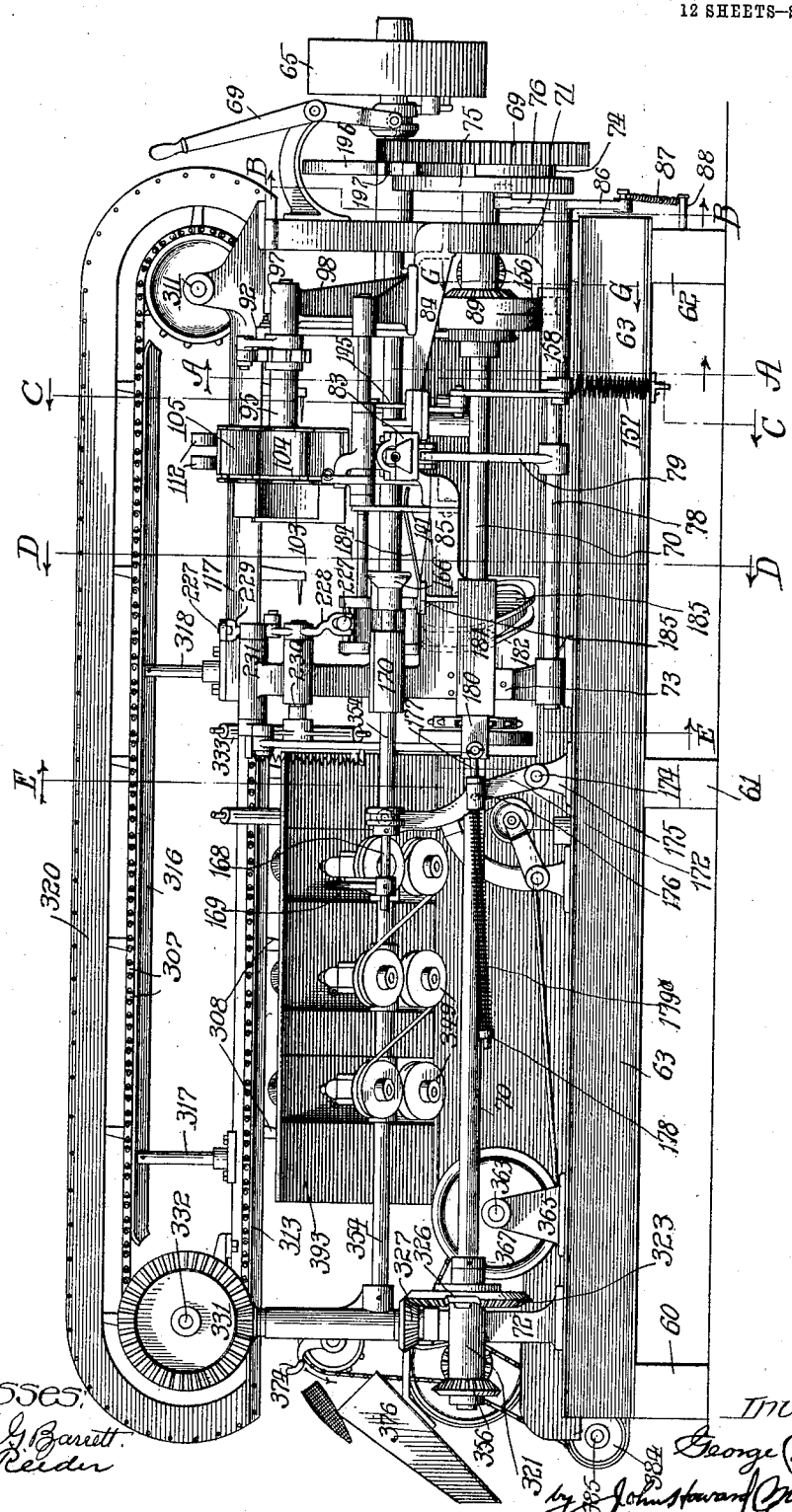

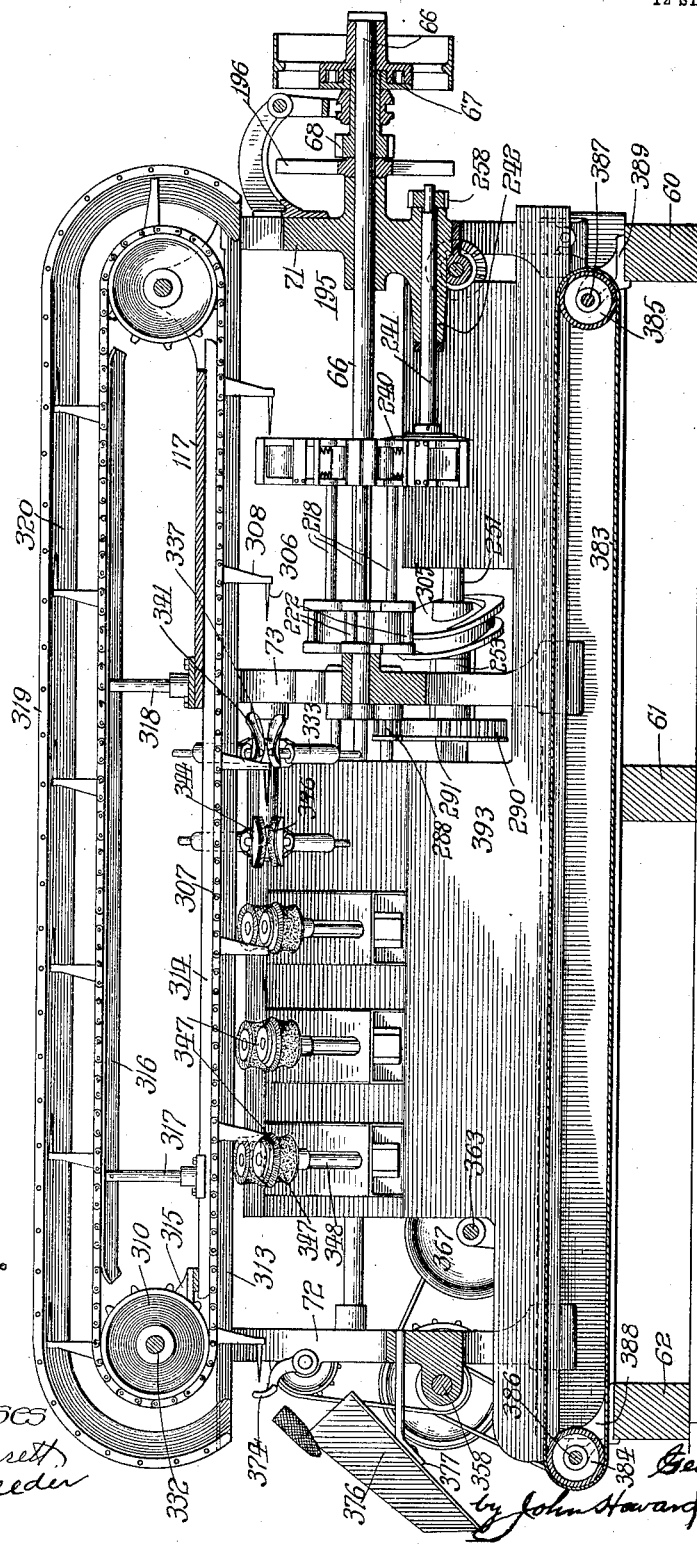

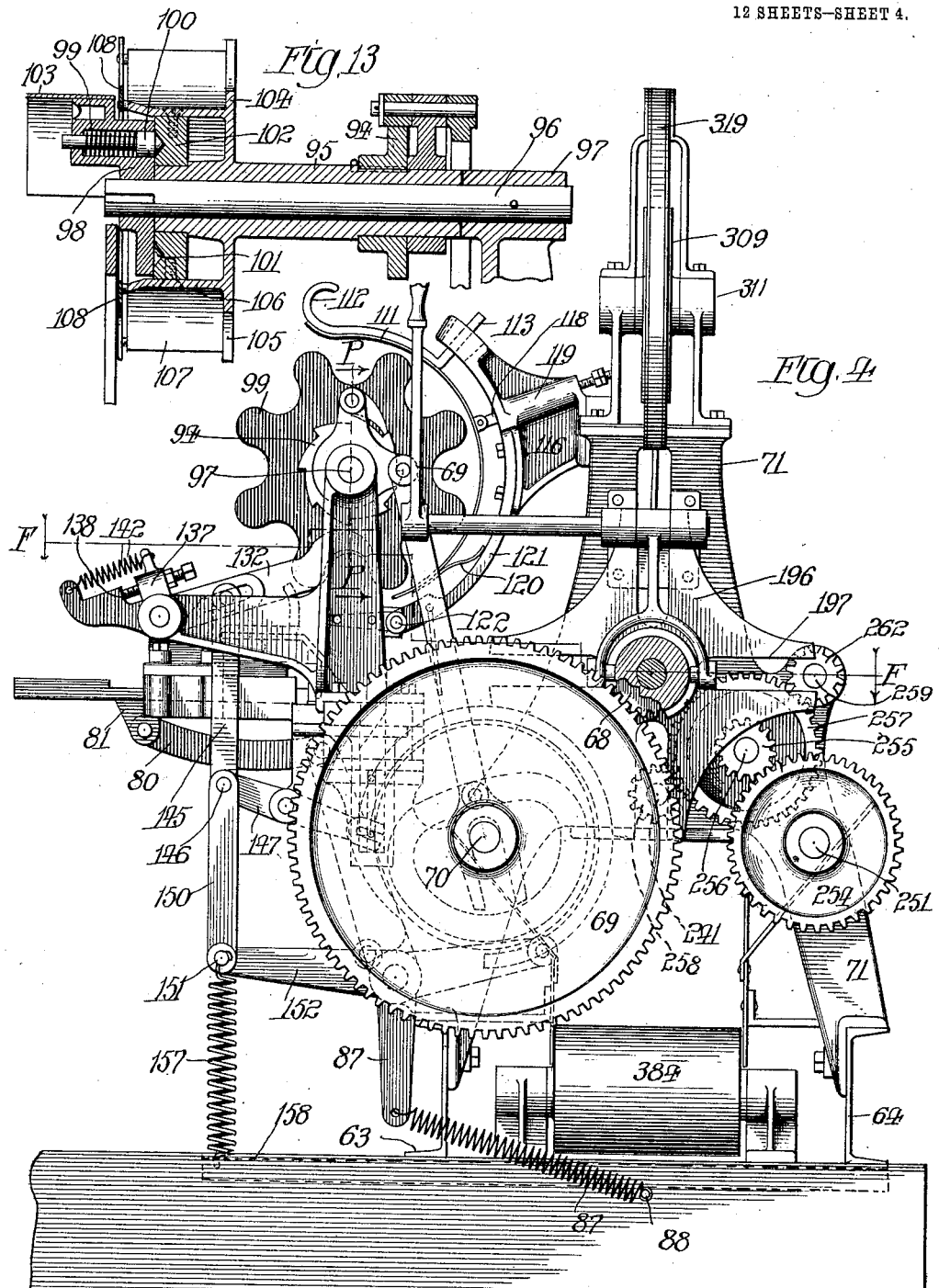

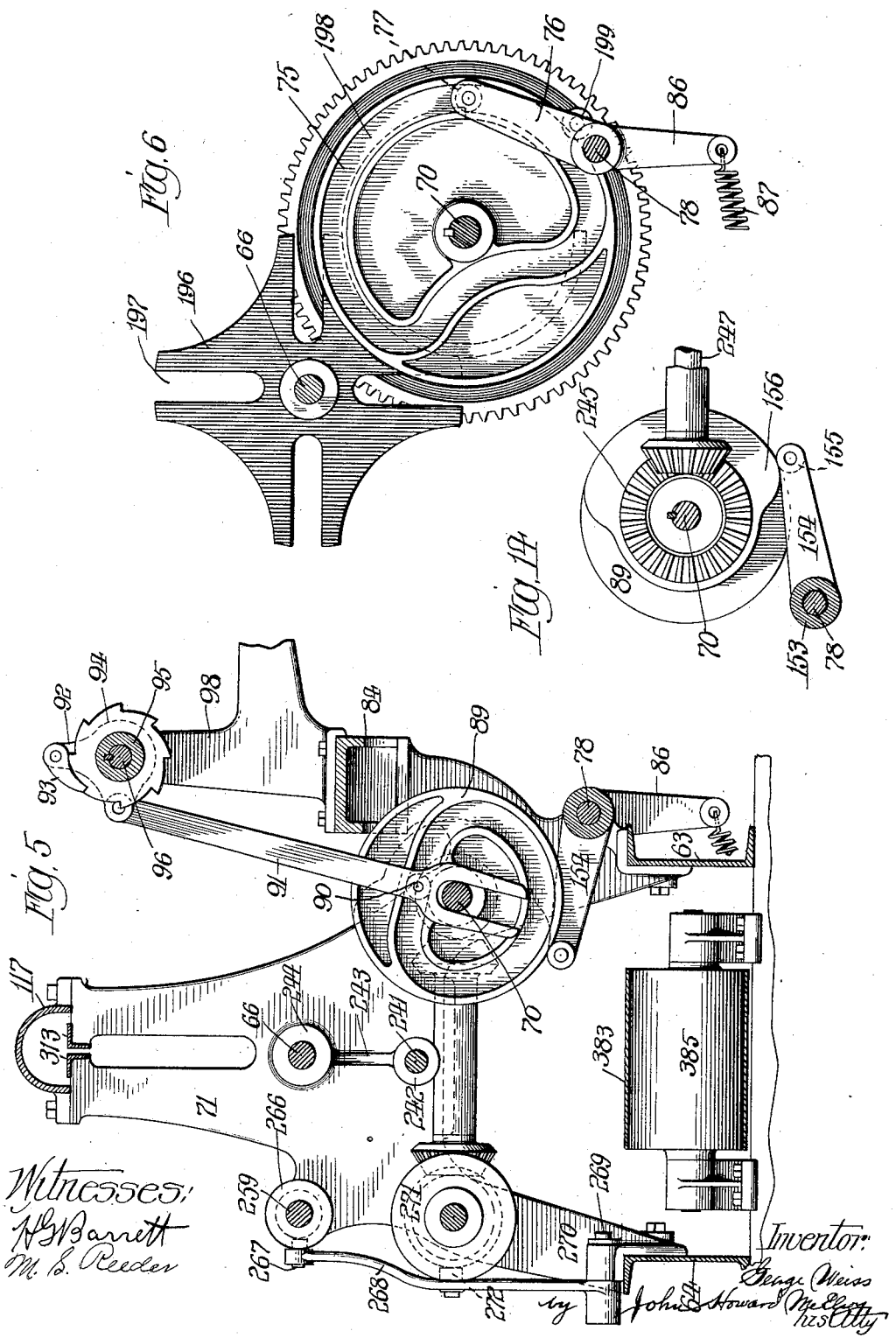

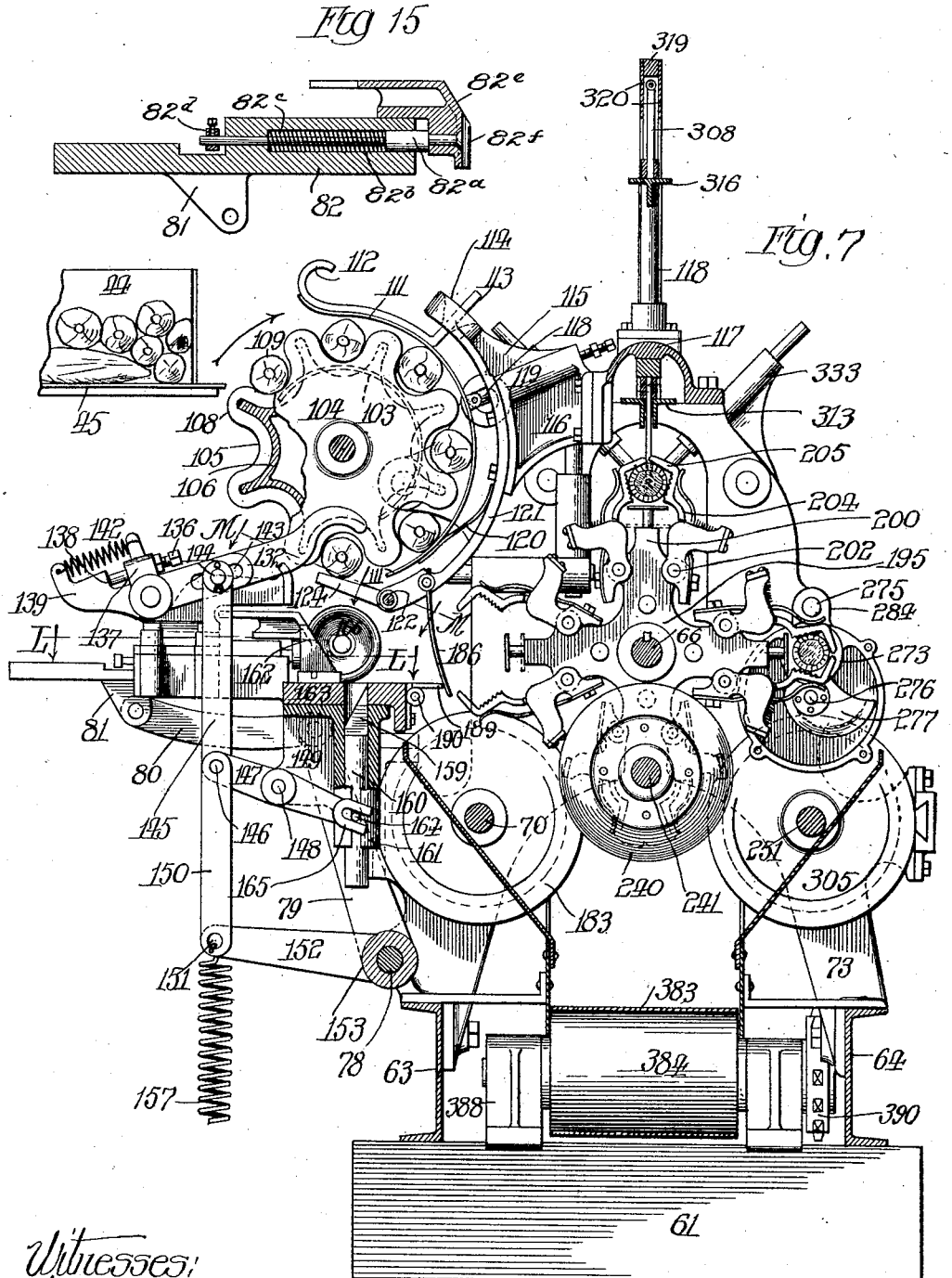

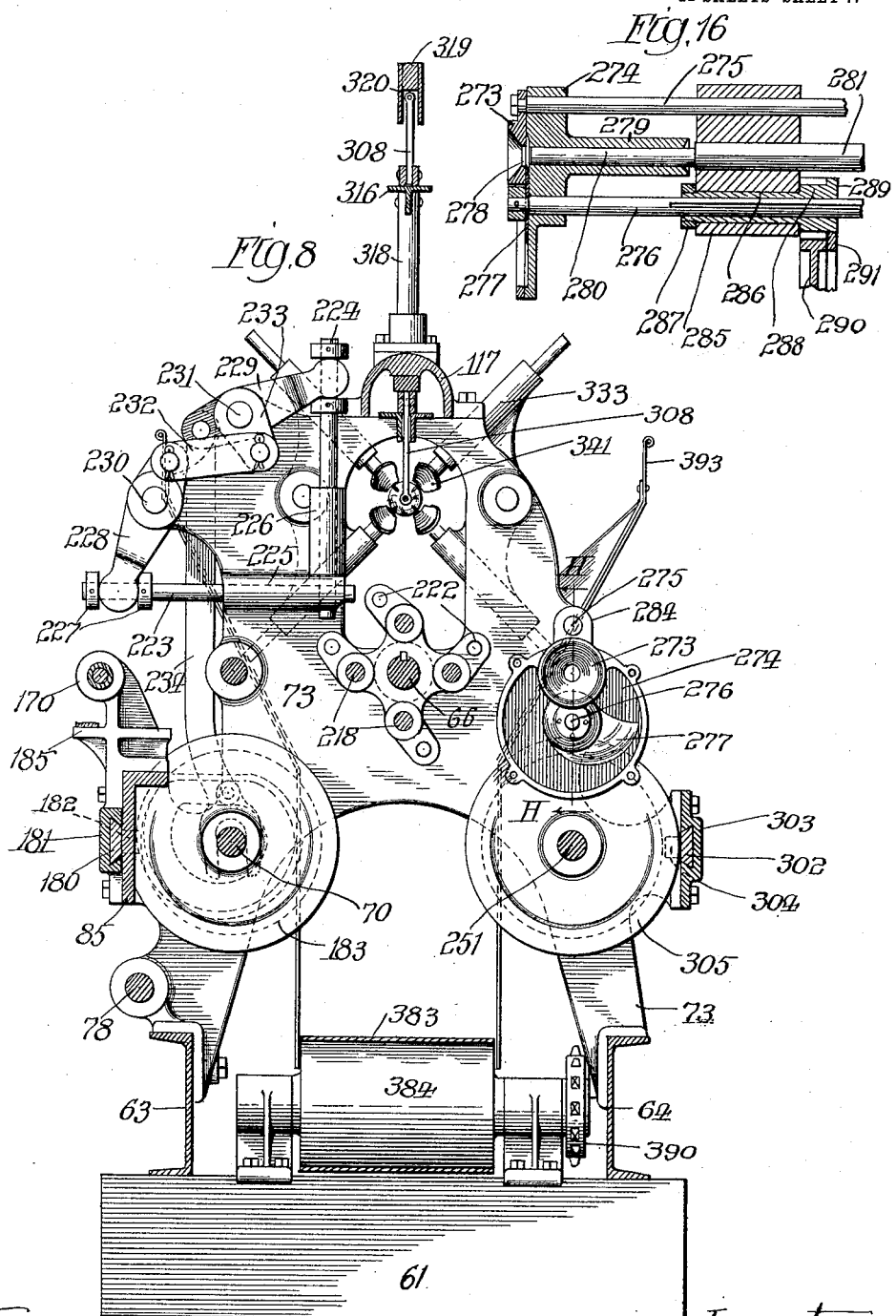

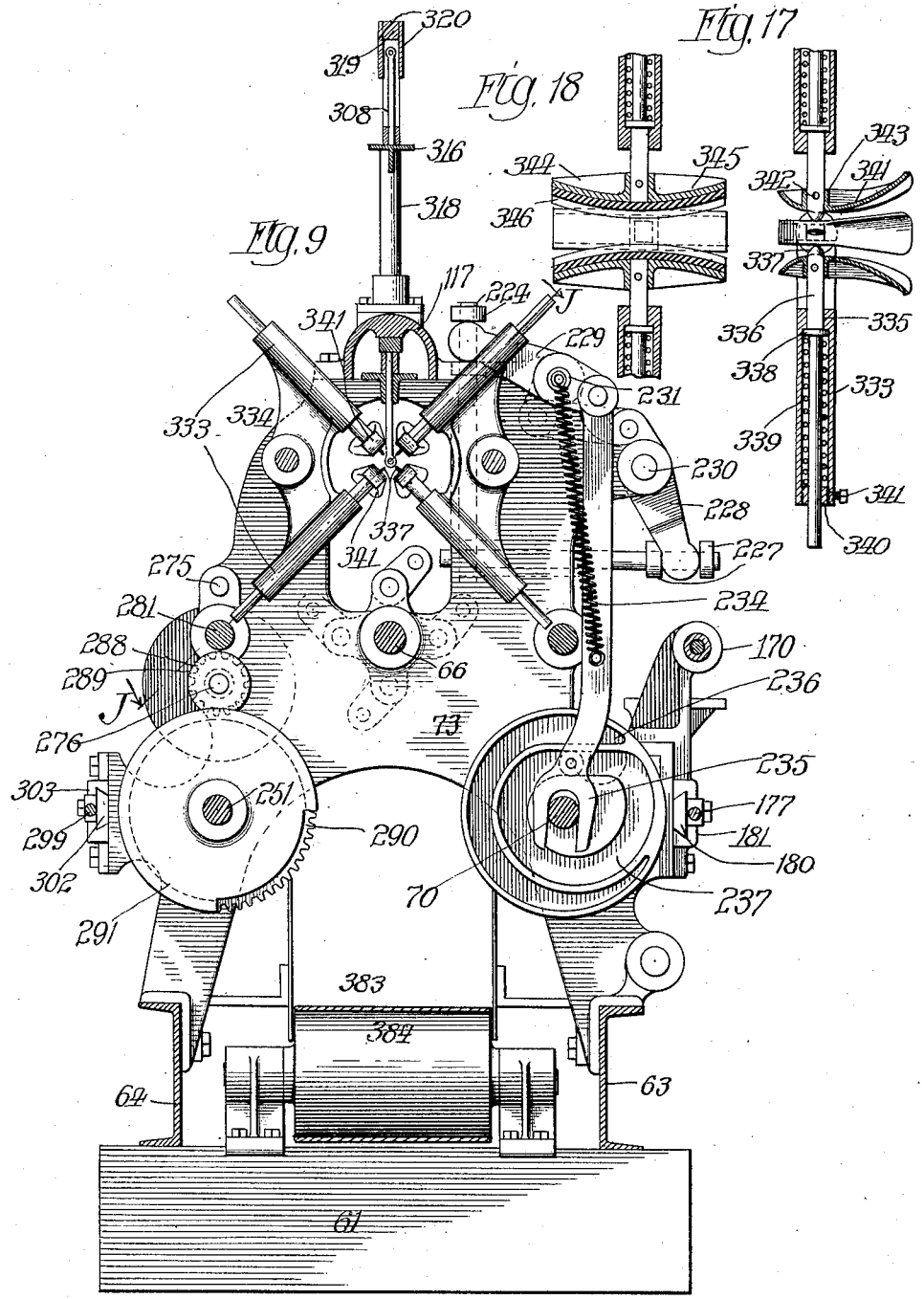
G. WEISS.
GREEN CORN HUSKING MACHINE.
APPLICATION FILED DEC. 21, 1906.
1,055,957.
Patented Mar. 11, 1913.
12 SHEETS—SHEET 8.

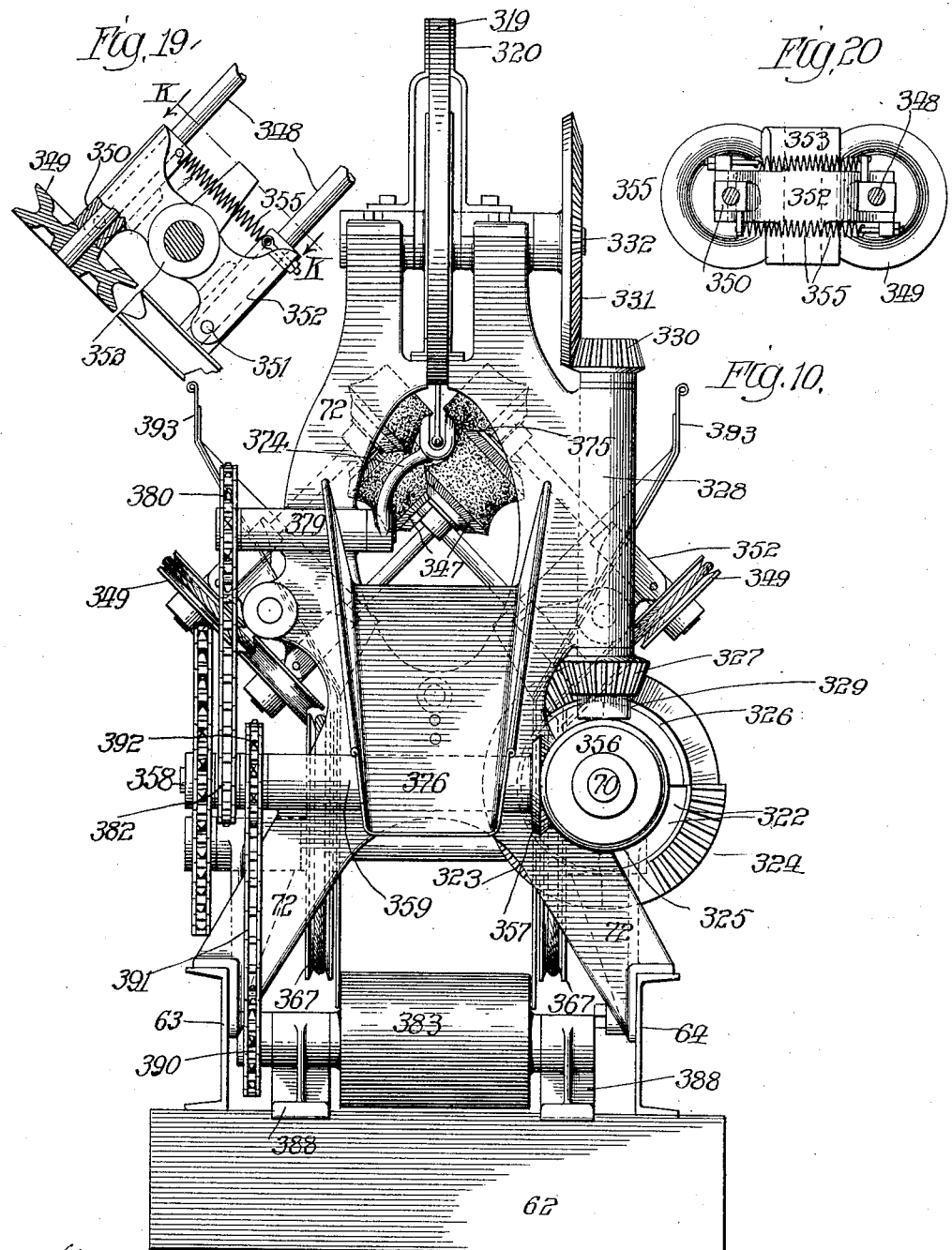

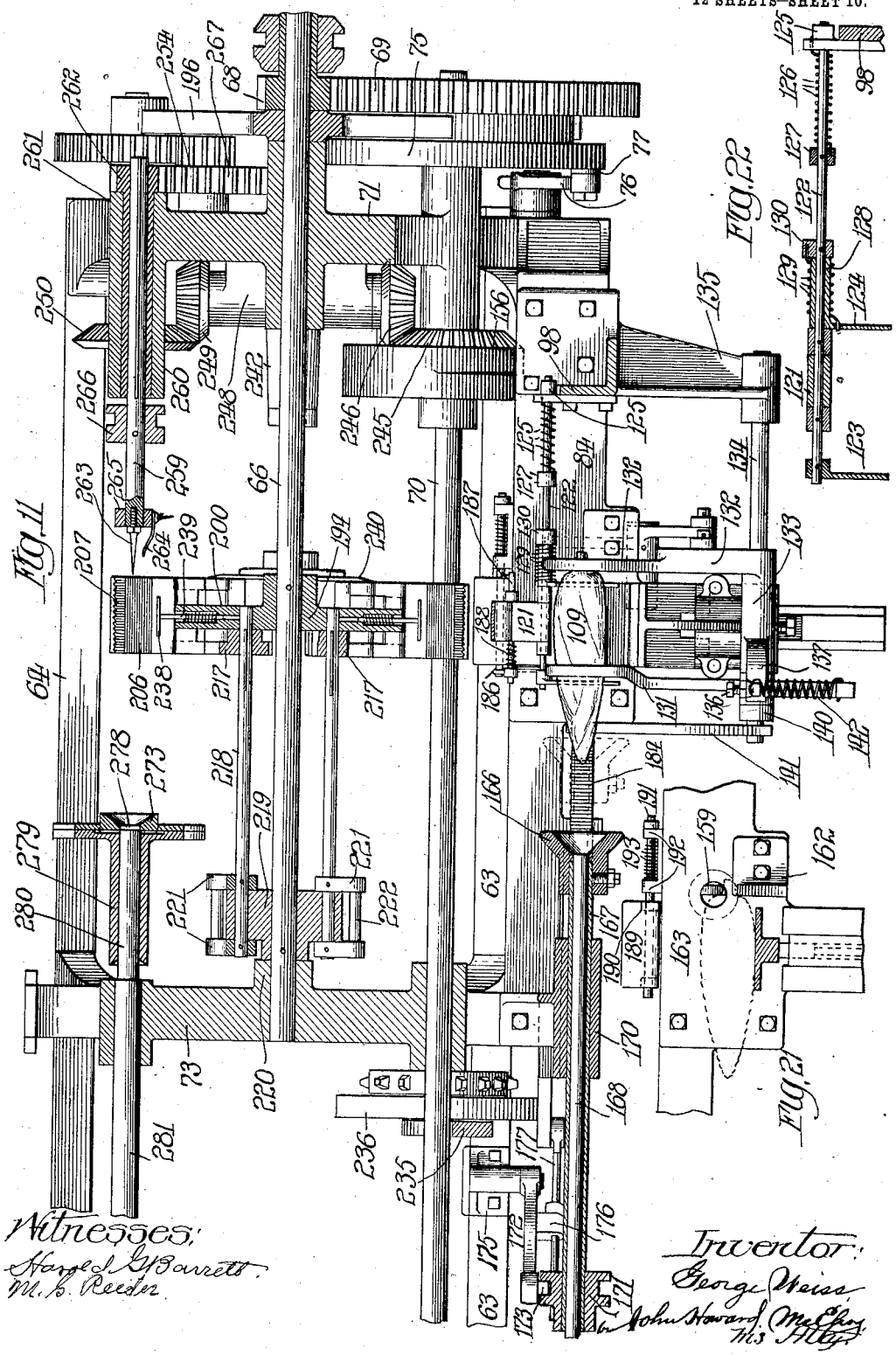

G. WEISS.
GREEN CORN HUSKING MACHINE.
APPLICATION FILED DEC. 21, 1906.
1,055,957.
Patented Mar. 11, 1913.
12 SHEETS—SHEET 11.
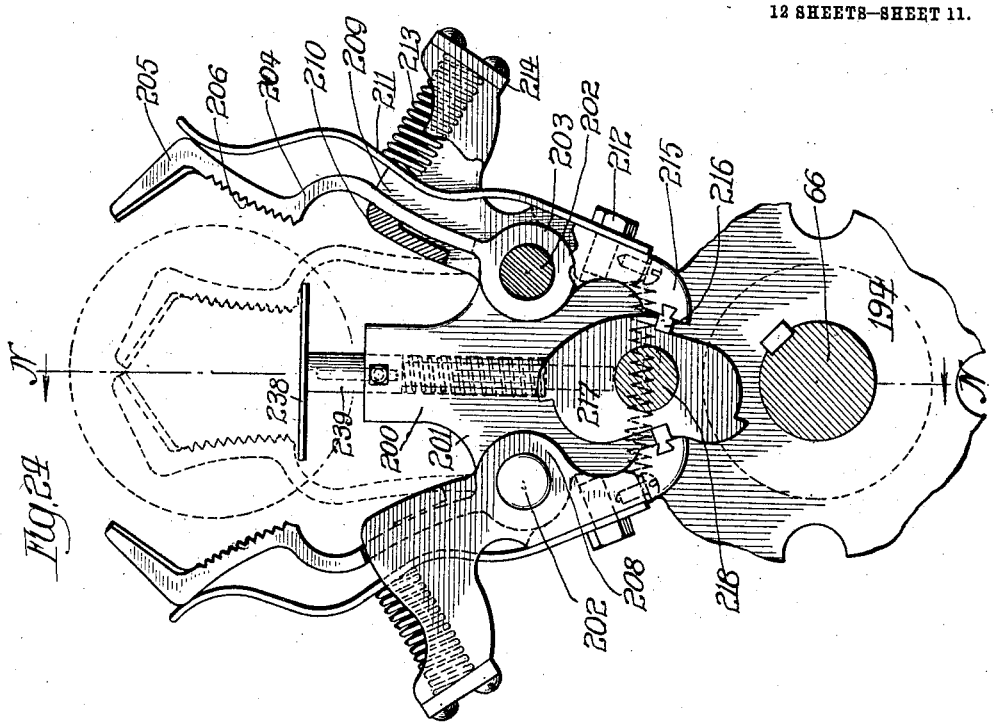
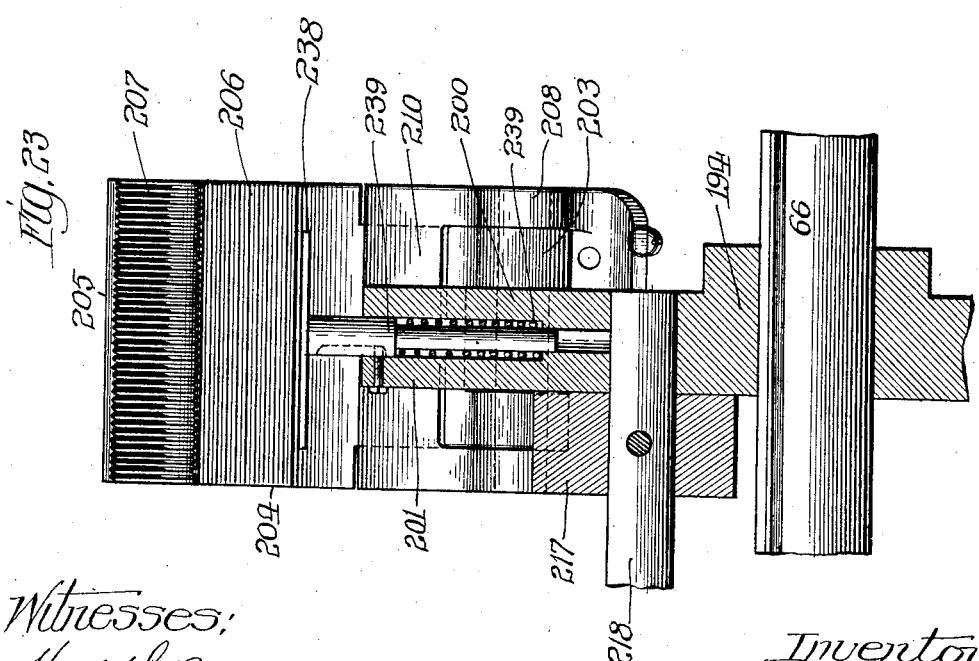

G. WEISS.
GREEN CORN HUSKING MACHINE.
APPLICATION FILED DEC. 21, 1906.
1,055,957.
Patented Mar. 11, 1913.
12 SHEETS—SHEET 12.
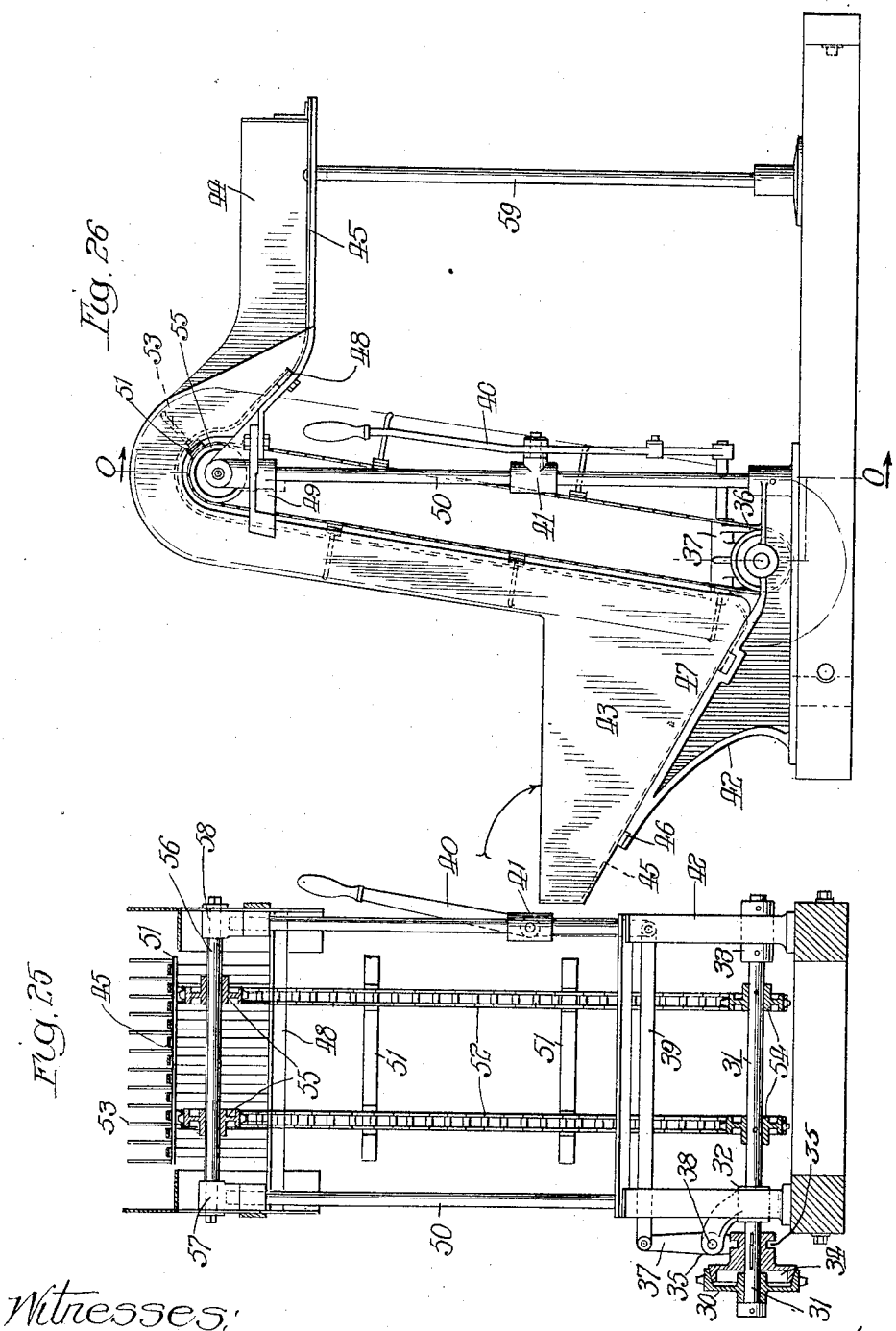

UNITED STATES PATENT OFFICE.

GEORGE WEISS, OF CHICAGO, ILLINOIS.

GREEN-CORN-HUSKING MACHINE.

1,055,957. Specification of Letters Patent. Patented Mar. 11, 1913.

Application filed December 21, 1906. Serial No. 348,986.

*To all whom it may concern:*

Be it known that I, GEORGE WEISS, a citizen of the United States, and a resident of Chicago, in the county of Cook and State of Illinois, have invented certain new and useful Improvements in Green-Corn-Husking Machines.

My invention is concerned with a novel apparatus for automatically removing the husks and silk from ears of green Indian corn or maize, which have been jerked—*i. e.*, detached—from the stalk without husking, and is designed to produce a device which shall accomplish automatically that which has heretofore been done manually.

My present invention is of the same general type as the apparatus for which Letters Patent were granted me August 8, 1905, No. 796,481, and many of the features of the present invention are improvements in specific details of the prior machine, whereas other features are more generic in their nature, and are capable of being applied to widely different machines.

To illustrate my invention, I annex hereto twelve sheets of drawings, in which the same reference characters are used to designate identical parts in all the figures, of which,—

Figure 1 is a left-hand side elevation of the machine, with the observer supposed to be standing at the receiving end; Fig. 2 is a right-hand side elevation of the machine; Fig. 3 is a central longitudinal section; Fig. 4 is an end elevation of the receiving end of the machine, with the driving clutch in section; Fig. 5 is a vertical section on the line A—A of Fig. 1; Fig. 6 is a similar view, on the line B—B of Fig. 1; Fig. 7 is a vertical section on the line C—C of Fig. 1; Fig. 8 is a vertical section on the line D—D of Fig. 1; Fig. 9 is a vertical section on the line E—E of Fig. 1; Fig. 10 is an end elevation of the discharge end of the machine; Fig. 11 is a horizontal section on the line F—F of Fig. 4; Fig. 12 (Sheet 2) is a detail, on an enlarged scale, in section, through the butt-scoring mechanism; Fig. 13 (Sheet 4) is a detail, in section, on the line P—P of Fig. 4; Fig. 14 (Sheet 5) is a detail on the line G—G of Fig. 1; Fig. 15 (Sheet 6) is a longitudinal section through the horizontal pusher of the ear-feeding mechanism; Fig. 16 (Sheet 7) is a longitudinal section on the line H—H of Fig. 8; Fig. 17 (Sheet 8) is a section on the line J—J of Fig. 9; Fig. 18 is a similar sectional view through the stationary brushes; Fig. 19 (Sheet 9) is a detail showing the connections of the driving spindles for the rotary brushes; Fig. 20 is a view in section on the line K—K of Fig. 19; Fig. 21 (Sheet 10) is a detail in section on the line L—L of Fig. 7; Fig. 22 is an enlarged detail in section on the line M—M of Fig. 7; Fig. 23 is an enlarged detail of one of the clamps of the primary conveyer, in section on the line N—N of Fig. 24; Fig. 24 is a side elevation of the clamp seen in Fig. 23, from the left-hand side thereof; Fig. 25 is a vertical section of the feed supply mechanism, on the line O—O of Fig. 26; and Fig. 26 is a side elevation of the feed supply mechanism.

I may employ in connection with my invention, the feed supply mechanism shown in Figs. 25 and 26, which is intended to supply the ears of corn to the operator of the machine, and is adapted to be placed in juxtaposition to the feeding mechanism proper, and to be operated from the machine by means of a sprocket chain driven thereby and coöperating with the sprocket wheel 30, which is loosely mounted on the end of the shaft 31, which is journaled in suitable bearings 32 and 33 in the framework of the mechanism. This sprocket wheel 30 preferably constitutes one member of a friction clutch mechanism, its interior being inversely cone shaped, as shown, and cooperating with the other member 34 of the friction clutch mechanism, which member 34 is splined on the shaft 31 and contains the groove 35, with which coöperate the arms 36 of the shifting lever 37 pivoted at 38 in a bracket in the framework, and having its upper end connected by the link 39 with the hand lever 40 pivoted upon a suitable bearing 41 arranged on the framework of the machine, so that the operator can throw the clutch into or out of operation, as may be desired. Secured upon the castings 42 are the sheet-metal sides 43, the lower horizontal portions of which form the sides of a hopper, and the substantially vertical portions of which form the sides of the conveying trough leading up to the receptacle 44 in which the ears are delivered, and from which the operator takes them one by one to place in the machine. The bottoms of the hopper, of the conveyer trough, and of the receptacle are formed by the metallic strips 45, which are suitably shaped for this purpose, and which are supported by the cross strips 46 and 47 on the castings 42, and the cross strip 48 supported from the brackets 49 secured upon the vertical side rods 50 of the apparatus. The ears are carried from the hopper to the receptacle by means of the forks 51, which consist of the cross bars secured to the sprocket chains 52, and provided with teeth 53. These sprocket chains 52 are mounted upon the sprocket wheels 54 and 55 secured on the shaft 31 and upon the corresponding parallel shaft 56 journaled in the bearings 57 and 58 at the top of the machine, which bearings may form a part of the brackets 49. The portion of one of the side pieces 43 adjacent the receptacle 44 may be cut away, if desired, as shown, to leave the receptacle open at that side. The outer end of the receptacle is supported by the standard 59.

The operation of this auxiliary feeding apparatus will be readily apparent. The jerked corn is shoveled into the hopper, and when the operator desires a supply, the hand lever 40 is shifted so as to throw it into operation, and the ears are carried up and delivered in the proper horizontal position into the receptacle 44, from which they are taken one by one by the operator and placed in the machine. When a sufficient quantity has accumulated in the receptacle, the hand lever 40 may be shifted to stop it until the supply is sufficiently diminished, in case the apparatus should be geared to feed more corn to the machine than it will take care of, as is ordinarily the case. Of course, it will be understood that I might use a treadle in place of the hand lever 40. Coming now to the machine proper, I have shown it as mounted upon the cross sills 60, 61 and 62, and as having the two longitudinal base sills 63 and 64, which may be conveniently constructed of strong channel bars. Upon these longitudinal sills are bolted the various castings that make up the framework of the machine. The power is applied to the belt wheel 65, which is mounted to rotate upon the shaft 66, and is provided with the clutch mechanism 67, by which it can be clutched to the pinion 68, which is sleeved on the same shaft 67, as best shown in Fig. 3. An operating lever 69 is provided by which the clutch mechanism may be engaged or disengaged, as the case may be.

In describing the driving connections, as each particular mechanism is taken up, I will describe so much of the connections as operate that particular mechanism, so that when all of the mechanisms have been described, the entire driving connections will have been discussed. The pinion 68 meshes with the gear wheel 69, best seen in Fig. 4, which is secured upon that end of the time shaft 70 which is journaled in suitable bearings in the end castings 71 and 72, and in the intermediate casting 73. This shaft 70 has secured thereto, next to the pinion 69, the Geneva stop driving disk 74, the function of which will be described later. Next to the disk 74 is the box cam 75, best shown in Fig. 6, and the lever 76 coöperating therewith has the anti-friction roller 77 extending into the groove of said cam, so that the lever, which is secured upon the rock shaft 78, will cause said shaft to be rocked back and forth at each rotation of the shaft 70 to reciprocate the pusher of the feeding apparatus. This rock shaft 78 is journaled in suitable bearings in the end castings 71 and in the intermediate casting 73, as will be seen from Fig. 1. About midway the length of this shaft, it has secured thereon the arm 79, best seen in Fig. 7, and this arm 79 carries at its upper end the link 80, which has its outer end pivoted to the ear 81 of the pusher 82, which is best shown in cross section in Fig. 15, and which reciprocates in the guideway 83, seen in end elevation in Fig. 1, and supported from the brackets 84 and 85 extending inwardly thereto from the end castings 71 and 73, respectively. The forward end of the pusher 82 is preferably yielding, as shown, it having the bearing stem $82^a$ reciprocating in the bearing recess $82^b$, and normally held in its forward position by the helically-coiled expanding-spring $82^c$ placed in said recess, surrounding the reduced portion of the stem $82^a$ and coöperating with the end of the recess and the shoulder on the stem. A collar $82^d$ secured on the stem serves to limit the forward movement of the engaging portion of the pusher, which has the inclined portion $82^e$, which assists in positioning the stem of the ear between the gage members 159 and 162, to be subsequently described. The vertical portion $82^f$ serves to engage the body of the ear when it is shoved forward by the pusher into the jaws of the primary conveyer to be described. This yielding structure of the face of the pusher is provided so that the machine can accommodate itself to ears of different diameters. The lever 76 is provided with the arm 86, extending downwardly and having the helically-coiled spring 87 connected thereto and to the pin 88 secured to the transverse sill 62, the function of this spring being to assist the cam 75 in returning the pusher to its receiving position, the angle of the cam being, as will be seen in Fig. 6, quite steep, and the addition of the spring materially facilitates the operation thereof. The shaft 70 also has secured thereon, intermediate the end standard 71 and the middle standard 73, and nearer the end standard, the box cam 89, best seen in Fig. 5, and the groove of this cam coöperates with the anti-friction roller 90 secured upon the link 91, the lower forked end of which embraces the shaft 70. The upper end of the link 91 is pivoted to one arm of the bell crank lever 92, the other arm of which carries the dog 93 which coöperates with the ratchet wheel 94, which is secured upon the sleeve 95, as best seen in Fig. 13, which sleeve is mounted to rotate upon the bearing shaft 96, which is supported in the elongated bearing 97 carried at the upper end of the bracket 98 secured upon the casting 84.

The sleeve is held from longitudinal movement on the shaft 96 by means of the disk 98 secured on the unsupported end of said shaft, and this disk 98 carries the plunger receptacle 99, in which is mounted the spring-pressed plunger 100, which coöperates with the positioning recess 101 placed at equi-distant positions in the face of the disk 102 secured on the outer end of the sleeve 95, so that as the sleeve is advanced by the dog 93 coöperating with the ratchet wheel 94, it will always be brought into the exact position desired. I also utilize this disk 98 to furnish the support for the curved metal plate 103, seen in Fig. 13 and in dotted lines in Fig. 7, which plate furnishes a bearing for the outer end of such ears as happen to be of abnormal length. The main support for these ears is formed by the receptacle, which is built up of the disk-shaped plate 104, which may be cast integral with the sleeve 95, and which has as many recesses 105 as there are teeth in the ratchet wheel 94. Projecting to the left from this disk 102 is the flange 106, which is of the shape clearly shown in Fig. 7, and which is preferably screwed to the disk 102, as shown, and has its outer edge turned outward slightly so as to conform to the shape of the ears, one of which is placed in each of the pockets 107 formed by said flange 106. Another thinner disk 108, of the same general outline as the disk 102, is secured on the other side, as clearly shown in Figs. 7 and 13, and serves to support the silk ends of the ears in the same manner that the butt ends are supported by the disk 102. The ears 109 of the corn are placed by hand in this intermittently-rotated carrier, and they are held in position for about one hundred and eighty degrees of their movement by means of the curved spring plate 111, which is secured at its upper end to the arm 112, suitably shaped to support it, and having its end 113 extending radially of the carrier and projecting through an aperture 114, which is of sufficient size to give some play to the movement of the arm 112, and which is formed in the bearing formed on the upper end of the casting 115 which is bolted to the casting 116, which, in turn, is bolted to the casting 117 extending from the top of the standard 71 to the standard 73, as shown in Figs. 1 and 7. The spring 112 also has secured to it the spring-pressed plunger 118, which slides in the radial bearing sleeve 119 formed in the casting 116. The lower end of the spring 111 is supported by the leaf spring 120, which is secured upon the curved arm 121 forming an extension of the casting 115.

By the construction shown, it will be apparent that I have formed a yielding semi-circular guiding and holding member which serves to hold the ears in their positions in the pockets of the carrier until they are ready to be discharged therefrom. In the lower end of the arm 121, I journal the shaft 122, best seen in Figs. 11 and 22, which shaft carries the two spring-held fingers 123 at its outer end, and the finger 124 intermediate its end. The shaft 122 is also mounted in the bearing 125 bolted to the bracket 98, and a helically-coiled torsion-spring 126 is secured to said bearing and surrounds said shaft, and has its other end secured in the collar 127 secured to the shaft, so that the fingers are held yieldingly in the position shown in Figs. 4 and 7. The finger 124 yields independently of the finger 123, it having the elongated bearing hub 128, which is surrounded by the helically-coiled torsion-spring 129, one end of which is secured to the finger 124, and the other end of which is secured to the collar 130 secured upon the shaft 122. As seen in Fig. 11, these fingers coöperate with the silk and butt ends of the ears, respectively, and the spring adjustment shown is to enable them to properly hold all sizes and shapes of ears until such time as they are forced out from the carrier.

The ears are discharged from the carrier in front of the pusher 82 by means of the arms 131 and 132. The arm 132 is provided with the bearing sleeve 133, which is secured upon the shaft 134, which is secured or journaled in the bearing bracket 135 extending out from the casting 98. The arm 131 is adjustable in its angular position relative to the arm 132 by means of the set screw 136 (see Figs. 7 and 11), which is screwed through the lug 137 carried by the bearing sleeve 133, and takes against the abutment 138 formed on the rearward extension 139 of the arm 131, which arm is, of course, pivoted upon the shaft or rod 134 between the sleeve 133 and the collar 140. The outer end of the shaft 134 is secured or journaled in the arm 141 bolted to the casting forming the support for the guide 83, as seen in Fig. 1. A helically-coiled contractile-spring 142 secured to the outer end of the extension 139, and to the lug 137, holds the arm 131 in its downward position. The adjustment shown between the arms 131 and 132 enables me to adjust these arms so as to coöperate to the best advantage with the average ears of the particular run of corn that is being handled.

The arm 132 is provided with the slot 143, in which is secured the bearing pin 144, upon which is journaled the link 145, which extends downward to the bearing pin 146 which is supported in the outer end of the lever 147, which is pivoted at 148 to a bearing bracket 149 secured to the outer end of the casting 84. The same bearing pin 146 also serves as a connecting pin for the link 150, which extends down to and is pivoted at 151 to the arm 152 formed on the adjacent end of the elongated bearing sleeve 153, which is mounted to rock on the shaft 78. The other end of the sleeve 153 is provided with the arm 154, which, as seen in Fig. 14, carries the anti-friction roller or engaging abutment 155 coöperating with the cam 156, which is formed integrally with the box cam 89. A helically-coiled contractile-spring 157 (seen in Figs. 1, 4 and 7) is attached to the outer end of the arm 152 and to the bar 158, which is extended to that point from the longitudinal sills 63 and 64, to the under side of which it is secured. This spring 157 serves to hold the anti-friction roller 155 against the cam 156. The action of this mechanism in rocking the inner ends of the arms 131 and 132 downward to discharge the ear in front of the pusher 82 will be readily apparent. At the same time that the ear is discharged, the abutment 159, which takes the shape of the triangular plate formed upon or secured to the upper end of the reciprocating rod 160 sliding in the bearing 161, is elevated into position to coöperate with the stationary abutment 162 secured upon the ear-supporting plate 163, best seen in Fig. 21, the two abutments 159 and 162 serving to position the butt end of the ear. It will be apparent that the abutment 159 is elevated by reason of the pin 164 carried by its rod 160 being engaged by the fork 165 forming the inner end of the lever 147.

It is of great importance, before the ear is delivered to the primary conveyer, to be subsequently described, that the position of the butt end of the cob be very accurately determined with relation to this primary conveyer, and for this purpose the abutments 159 and 162 act as a gage between which the stalk of the ear 109 is placed, so that the ear can be shoved longitudinally against said abutments by means of the inversely conical-shaped end 166 of the positioning member, best shown in Figs. 1 and 11, and which consists of this end or head 166, which is secured upon the sleeve 167 which reciprocates upon the stationary bearing rod 168, the outer end of which is secured in the bracket 169 extending from a bearing to be subsequently described. The sleeve 167 also has a bearing in the stationary sleeve 170, which is secured to the standard 73. The sleeve 167 has secured thereon the grooved collar 171, and the lever 172 has at its upper end the pin 173 taking into the groove of the collar 171. The lever 172 is pivoted at 174 to the bearing bracket 175 carried by the sill 63, and has swiveled thereon the sleeve 176, through which extends the rod 177, the outer end of which carries a collar 178, and a helically-coiled expanding-spring 179 surrounds the rod 177 between the collar 178 and the sleeve 176. The inner end of the rod 177 is pivoted to the bearing slide 180, which is mounted to slide horizontally in the guideway 181 secured to the standard 73. On the inner face of the other end of the slide 180 is mounted the anti-friction roller or other bearing stud 182, which takes into the groove of the cam 183, which is secured upon the shaft 70. By means of the connection shown, it will be apparent that at each revolution of the shaft 70 the sleeve 167 and its associated head 166 are moved toward the ear of corn, which is positioned by the abutments 159 and 162, until it contacts with the silk end of the ear, after which it will push the ear against the abutments until it engages them so firmly that thereafter the spring 179 is compressed, and the further movement of the sleeve 176 does not cause the positioning head 166 to be advanced farther. At the time the ear 109 is resting upon the plate 163, if it should be uncommonly long, its silk end is supported by the leaf spring 184, shown in Figs. 1 and 11, which is suitably shaped, and which is supported from the bracket 185 secured to or formed integral with the bracket 85. By this mechanism it will be apparent that the longitudinal position of the ear with reference to the butt end of the cob is accurately determined. The parts are so timed that after the ear is thus positioned upon the plate 163, the abutment 159 descends and the pusher 82 moves inward to force the ear into the clamps of the primary conveyer, one pair of which are opposed to it and opened, as seen in Fig. 7. As the ears pass to these clamps, they swing aside the spring-held arms 186, shown in Figs. 7 and 11, which arms are secured upon the rock shaft 187, which is journaled in the arm 121 a little distance above the shaft 122, and is provided with the helically-coiled torsion-spring 188 surrounding a portion of the shaft and secured to the arm 121 at one end, and to one of the arms 186 at the other end, so as to hold them yieldingly in the position shown in Fig. 7.

In connection with the table 163, which is wide enough for the ordinary ear, I provide a pivoted extension 189, seen in Figs. 7 and 21, which comes into play only when an unusually long ear is passing through the machine. The plate is secured by means of the ears 190, shown in dotted lines in Fig. 21, to the shaft 191, which is mounted to rock in the bearing ears 192 secured to the edge of the plate 163. A helically-coiled torsion-spring 193 surrounding the shaft 191 between the ears 192, and secured at one end to one of said ears and at the other end to the shaft, serves to hold the plate 189 yieldingly in its horizontal position, from which it is moved only as an uncommonly large ear is carried past it by the movement of the clamp of the primary conveyer.

The primary-conveyer mechanism is best illustrated in Figs. 7, 8, 11, 23 and 24. It is carried by the shaft 66, to which the supporting spider 194 is splined, as shown in Fig. 24. This shaft 66 has secured thereto, adjacent the gear 68 and just outside of the elongated bearing 195 formed in the standard 71, the Geneva stop driven member 196, which will have as many of the slots 197 as there are clamping members in the primary conveyer,—in the present case, four. As seen in Fig. 6, the shaft 70 has secured to it, between the cam 75 and the gear wheel 69, the locking surface 198 of the driven member of the Geneva-stop mechanism, and also the driving roller 199, which roller 199 coöperates with the slots 197 of the driven member in the customary manner. This mechanism results in the primary conveyer being rotated through an angle of ninety degrees during one-fourth of the rotation of the shaft 70, and in its being locked from any possible movement during the remaining three-quarters of the revolution.

Turning now to the details of the clamping members, as best shown in Figs. 23 and 24, the spider 194 has the four arms 200, each of which is provided with the pair of ears 201, through which pass the bearing pins 202. Just outside of these ears are the ears 203 of the clamping members proper 204, which will be seen to have the jaws 205, the inner faces of which are longitudinally corrugated, as seen at 206, and the outer faces of which are transversely corrugated, as seen at 207. Outside of the ears 203 are the ears 208 of the clamp-controlling members 209. These clamp-controlling members have the webs 210, against which the clamping members 204 are pressed by means of the leaf spring 211 secured upon the jaws by means of the clamp-controlling members 209 by means of the set screws 212, and the action of this leaf spring 211 is reinforced by the helically-coiled expanding-springs 213 interposed between said springs 211 and the transverse plate 214 secured to the outer ends of the arms of the clamp-controlling members 209 in any suitable manner, as by the screws shown. This spring connection between the clamp-controlling members 209 and the jaws 205 will be seen to tend to hold the clamping jaws together and at the same time give them a very wide range of movement to accommodate them to different sizes of ears. The tails 215 of the clamp-controlling members 209 have set therein the bearing ribs 216, which are preferably of a hardened steel, and coöperate with the cams 217, which are likewise of a hard steel, and are secured upon the rock shafts 218, as best shown in Figs. 8 and 11, which rock shafts are journaled in suitable bearings in the spider 194 and in another spider 219 secured on the shaft 66 adjacent the bearing 220 formed in the intermediate standard 73. As seen in Fig. 8, each of these rock shafts 218 has secured thereto, on either side of the spider 219, the pair of arms 221, which carry the connecting rod 222, and these connecting rods 222 are adapted to be engaged alternately by the horizontal push rod 223 and by the vertical rod 224, which are mounted to reciprocate in the bearings 225 and 226, respectively, formed in the standards 73. Each of these push rods 223 and 224 has at its outer end the pair of collars 227, between which take the rounded ends of their operating levers 228 and 229, respectively, these operating levers being journaled upon the fulcrums 230 and 231 and having the short arm of the lever 228 connected by a link 232 with an auxiliary arm 233 secured to the lever 229. The short arm of the lever 229 has pivotally secured thereto the bar 234, which, as seen in Figs. 8 and 9, terminates in a fork 235 embracing the shaft 70 and carrying the anti-friction roller or other engaging member 236, taking into the grooves of the box cam 237 secured on said shaft 70. The action of the cam is, of course, to reciprocate the levers 228 and 229 at the proper time to open and close the clamping members. When the clamping members are brought opposite to the pusher to receive an ear, they are open in the position shown in Fig. 24.

After the ear has been pushed into the clamp, against the plate 238 carried by the spring-pressed plunger 239 mounted to reciprocate in the arm 200 of the spider, the action of the vertical plunger 224 against the rod 222 is to rock the shaft 218 and the associated cam 217 through an angle of ninety degrees, which movement brings the arms together, as shown in dotted lines in Fig. 24. If the ear is a large one, as indicated by the dotted circle in that figure, the springs 211 and 213 will yield sufficiently to accommodate the ear. The ear then clamped is carried during the next three operations of the machine around to the uppermost vertical position, where it is delivered to the secondary conveyer, and after it has been engaged by said conveyer, the action of the horizontal pusher 223 against the rod 22 will be to rock the cam 217 through the shaft 218 back to the position shown in Fig. 24, where it spreads the clamping jaws and allows the ear to be carried away. The ear now being firmly gripped by the clamps of the primary conveyer, with the butt end very accurately located by the feeding mechanism proper, the primary conveyer is rotated through an angle of ninety degrees, carrying the butt of the ear against the butt-trimming mechanism, which, as in my prior patent above referred to, consists of the rapidly-rotating cutting-disk 240, which is secured upon the shaft 241, which, as best seen in Figs. 2, 5, 7 and 11, is journaled in the elongated bearing 242 projecting inwardly from the standard 71 and connected by the rib 243 with the elongated bearing 244 just above it.

The shaft 241 is rapidly rotated from the time shaft 70 through the following mechanism, reference being had especially to Figs. 4 and 11. The cam 156, shown in Fig. 14, has secured thereon the bevel gear wheel 245, although, of course, it will be understood that the gear wheel might be separated from the cam and simply secured on the shaft. Meshing with the bevel gear wheel 245 is the bevel pinion 246 secured upon one end of the countershaft 247 mounted in the bearings 248 carried by the standard 71. The other end of the countershaft 247 has secured thereon the bevel pinion 249, which meshes with the bevel gear wheel 250, which is secured upon the secondary time shaft 251 journaled in the bearings 252 in the standard 71, and in a bearing 253 in the standard 73. The shaft 251 has secured on its outer end the gear wheel 254, which, as best seen in Fig. 4, meshes with the gear pinion 255 mounted on the bearing stud 256 projecting outwardly from the standard 71. The pinion 255 has rigidly secured thereto, to rotate therewith, the gear wheel 257 which meshes with the gear pinion 258 secured on the outer end of the shaft 241, and it will be apparent that the train of connections just pointed out will cause the shaft 241 to rotate very rapidly, so that the knife 240 will shear off the butt of the ear right up to the point where the grains of the corn begin on the cob. The next movement of the primary conveyer carries the ear to its forward position in said conveyer, where it is operated upon by the butt-scoring mechanism, best shown in Figs. 2, 5, 11 and 12. This butt-scoring device consists of the shaft 259, which is mounted to rotate and slide in a bearing 260 on the standard 71, it being splined, as clearly shown in Fig. 11, in the sleeve 261 mounted to rotate in the bearing 260, and having secured on the outer end thereof the pinion 262 which is driven by the rapidly-rotating gear-wheel 257, the driving connections for which were pointed out in connection with the description of the butt-trimming apparatus. This shaft 259 has secured on its inner end the drill 263, which is adapted to enter the center of the butt of the cob and drill into the pithy portion thereof so as to form a suitable aperture for the entrance of the spikes carried by the secondary conveyer. At the same time that the hole is being drilled in the cob, the butt-scoring knife 264 secured on the collar 265 carried on the end of the shaft 259 engages with the husks at the butt, and by its rotation, while the ear is fixed, scores and loosens them thoroughly, so as to be readily stripped off at a later stage in the operation of the apparatus. The shaft 259 has secured thereon the annularly-grooved collar 266, best seen in Figs. 2, 5 and 11, and the groove in this collar is engaged by the projection or finger 267 carried by the upper end of the lever 268, which is pivoted on the bearing pin 269 suitably supported in the bearing bracket 270 secured on the longitudinal sill 64. The shaft 251 carries the cam 271, the groove of which is engaged by the anti-friction roller 272, or equivalent element, carried by the lever 268, so that at the proper period at each rotation of the secondary time shaft 251, the cam serves to carry the shaft 259 forward so as to drill into the cob and score the husks at the butt end of the ear.

At the same time that the butt-scoring mechanism is operating, the tips of the ears are trimmed by the mechanism best shown in Figs. 2, 7, 8, 9, 11 and 16. This tip-trimming mechanism consists of an inverted conical shaped positioning-cap 273 carried by the disk-shaped casting 274, which is secured upon the outer end of the rod 275 and the shaft 276. The shaft 276 has secured thereon the knife 277, which has the preferably spiral shaped cutting edge beveled, with the bevel adjacent the disk against the surface of which the knife rotates in order to prevent the bevel of the knife from thrusting the tip back toward the ear and thus prevent its being properly cut off. The positioning cap 273 has its aperture 278 separated from the disk 274 by a sufficient distance so that the knife 277 can pass between the cap 273 and the disk 274, and neatly shear off the tips of the ears as they project through said aperture, thus cutting off the matted silks, which would otherwise interfere with the ready removal of the husks. The disk 274 has the sleeve 279 projecting rearwardly therefrom between the rod 275 and the shaft 276, and this sleeve receives the reduced end 280 of the bearing rod 281, which is secured in the bearing 282, and also in the bearing 283 in the rear standard 72. The rod 275 and the shaft 276 are mounted to reciprocate in the associated bearings 284 and 285, arranged above and below the bearing 282. The shaft 276 is mounted in said bearing indirectly, by reason of the fact that it is splined in the sleeve 286, which rotates in the bearing 285 and has the collar 287 at one end and the gear pinion 288 at the other end. This gear pinion 288, as best seen in Figs. 9 and 16, has associated therewith the locking disk 289, and the mutilated gear wheel 290 secured upon the shaft 251 engages the pinion 288 during a quarter of the rotation of said shaft and gives the pinion one complete rotation, and it is held locked from rotation during the other three quarters of the rotation of the shaft 251 by the locking disk 291 coöperating with the disk 289 associated with the pinion 288.

The tip-trimming mechanism is moved forward onto the tip of the ear by means practically the same as those shown for positioning the ear with reference to the primary feeding mechanism. This mechanism consists of the head 292 mounted to slide on the bearing rod 281, and having secured therein the rod 275 and the shaft 276. This head 292 carries the annularly-grooved collar 293, with the groove of which coöperates the pin 294 secured upon the upper end of the lever 295 pivoted at 296 in the bearing bracket 297 carried by the longitudinal sill 64. The lever 295 has swiveled thereon the bearing sleeve 298, through which slides the rod 299, which has the helically-coiled expanding-spring 300 interposed between the sleeve 298 and the collar 301 on the outer end thereof. The other end of the rod 299 is pivoted to the slide bar 302, which is mounted to slide in the bearing 303 secured on the standard 73. This slide bar 302 has projecting inwardly therefrom the bearing roller or pin 304, which enters the groove of the cam 305 secured on the secondary time shaft 251. As will be readily apparent, the action of this apparatus is to throw the tip-trimming mechanism forward so that the tip of the ear will enter the cap 273, and after this has been done, and at a position depending upon the length of the ear, the further movement of the slide 302 will compress the spring 300 so that the tip-trimming mechanism will stop at the necessary position. This completes the work of the elements coöperating with the primary conveyer, which is now given another quarter of a turn, carrying the ear to the uppermost position, where it is ready to have the aperture in the cob bored by the drill 263 engaged by one of the spikes 306 carried by the secondary conveyer, which has as its basis the chain 307 provided at suitable intervals with the arms 308 to which the spikes 306 are rigidly attached. The chain 307 is carried by the sprocket wheels 309 and 310 journaled in the bearings 311 carried by the castings 117 and 312 carried at the top of the standard 72.

It is essential for the satisfactory operation of the apparatus that the chain be guided on its lower run so as to prevent any movement thereof, and for this reason I provide the way made by the pair of angle irons 313 seen in cross section in Figs. 5, 7, 8 and 9, and in side elevation in Figs. 1, 2 and 3. The vertical webs of these angle irons are brought so closely together that the arms 308 barely have room to pass between them, and any vertical movement of the chain is prevented by means of the bar 314 arranged directly above the chain, and supported, as shown in Fig. 3, from the casting 117 and from the bracket 315 carried by the standard 72. The chain is supported during its upper run by the T-bar 316, seen in cross section in Figs. 7, 8 and 9, which is supported by the standards 317 and 318 carried by the bar 314 and the casting 117, respectively. To prevent the possibility of any one being hurt by the spikes 306 during the time that they are not in operation and upon the return run, I preferably provide the shield extending around the sprocket wheels and between them, and made up of the suitably-shaped bar 319 having the plates 320 secured on both sides thereof. The bar 319 is supported by the plates 320, which are secured at their ends to the angle bars 313. The connections for driving this secondary conveyer are best shown in Figs. 1 and 10, and are as follows: The time shaft 70 has its rear end journaled in the bearing 321 formed on the standard 72, and just inside of the bearing 321 it has secured thereon the mutilated bevel gear-wheel 322, which has the gear segment 323 extending through about one hundred and eighty degrees, and the smaller gear segment 324 extending through about sixty degrees, and separated from the main segment by the short locking surface 325 and the longer one 326. Coöperating with this mutilated gear wheel 322 is the gear pinion 327 secured upon the lower end of a vertical shaft journaled in the vertical bearing 328 carried by the standard 72. Below the pinion 327 is the locking member 329, which, for the construction shown, is square in cross section, so that it may coöperate properly with the surfaces 325 and 326. The upper end of the shaft carrying the pinion 327, has secured thereon the pinion 330, which meshes with the bevel gear wheel 331 secured upon the shaft 332, upon which the sprocket wheel 310 is secured. It will be apparent that a long movement is given to the chain, and we will consider this movement as carrying the ear away from the primary conveyer, and as bringing a fresh spike up to the position shown in Fig. 3.

The long pause then occurs, during which time the primary conveyer is rotated to bring a fresh ear into position to be operated upon. The short movement of the chain then occurs, and serves to insert the spike into the ear. The short stop then occurs, during which time the clamp holding the ear is open, and then comes the long movement of the chain, carrying the ear away from the primary conveyer.

The husk-slitting knives are first met after the ear leaves the primary conveyer, and the details of these knives are best shown in Figs. 3, 8, 9 and 17, where it will be seen that I employ the pairs of sleeves 333 arranged at right angles on the common bracket 334 secured to the standard 73. These sleeves have, mounted to slide in the rectangular apertures 335 at their inner ends, the knife shanks 336, which terminate in the rounded blades 337, the position of which is determined by the collar 338, against which presses the helically-coiled expanding-spring 339, confined between said collar and the threaded collar 340 screwed into the outer end of the sleeve and held in place by the set screw 341. It will be apparent that these knives can yield under the pressure of the springs to accommodate themselves to any size of ear, and that as the ear passes between them, four longitudinal slits will be made in the husks throughout the entire length of the ear. To properly guide the ear into position relative to the knives, I preferably attach to each one the guiding wing 341, which is of the general shape of a shoe horn, and is provided with means for securing it to the shank 336 of the knife, such as the pin 342 passed through the collar 343 carried by the wing 341. Just beyond these slitting wings are a set of stationary brushes 344, which, as seen in Fig. 18, are mounted similarly to the wings 341, so that they can yield to adjust themselves to different sized ears. These brushes consist of the guiding and supporting wing portions 345, which have secured on their faces the roughened elastic coatings 346, which are preferably made of india rubber, and have the operation of offering resistance to the passage of the ears, and as they engage with the husks which have had their butts scored and have been slotted longitudinally, these stationary brushes remove most of the exterior husks. The few remaining husks and the silks are then removed by the sets of rotating brushes 347, which are best shown in Figs. 1, 2, 3, 10, 19 and 20. I have shown six pairs of these brushes, but, of course, it will be understood that any desired number may be employed, and they are mounted in pairs on the spindles 348, which have the pulleys 349 at their other ends, and are journaled in the bearing sleeves 350 pivoted at 351 in the arms 352 of the bracket 353, which is secured on one side on the bearing rod 281, previously described, and on the other side on the bearing rod 354 supported between the standards 72 and 73, as best seen in Fig. 1.

The helically-coiled contractile springs 355 connected to the sleeves 350 serve to hold the brushes yieldingly together so as to operate upon any sized ear that may pass through the machine. These brushes are driven by means of the following connections: The time shaft 78 has secured on its extreme end, outside of the bearing 321, the bevel gear wheel 356, which meshes with a bevel gear pinion 357 secured upon the transverse shaft 358 journaled in the horizontal bearing 359 carried by the standard 72. At the other end, this shaft has secured thereon the large sprocket wheel 360, which, through the medium of the sprocket chain 361, drives the sprocket pinion 362 secured on the shaft 363 journaled in bearing brackets 364 and 365 carried by the longitudinal sills 64 and 63, respectively. This shaft 363 has secured thereon the pair of large shives 367, there being one of these shives on each side of the machine. The pulleys 349 and the shives 367 are suitably grooved to coöperate with the driving ropes 368, which pass around the shives 367, and then around the pulleys 349, as seen in Figs. 1 and 2, and thence over the guiding pulley 369 journaled upon the bearing bracket 370, and thence around the tensioning shive 371 mounted upon the swinging arm 372 pivoted on the standard or bracket 370, which carries the weight 373 suspended therefrom by a rope so as to furnish the necessary tension to drive these pulleys. After the ears have passed through these brushes, and had all the husks and silks removed, they are finally engaged by the ear discharger arm 374, best seen in Figs. 1, 2 and 10. This arm 374 has the forked end 375, which is suitably shaped to engage the butt of the ear and force it off of the spike 306, so that it will drop onto the chute 376 supported from the standard 72 by the bracket 377. The arm 374 is secured upon the shaft 378 journaled in the bearing 379 formed upon the standard 72. Upon the outer end of this shaft is secured the sprocket wheel 380, which, through the medium of the sprocket chain 381, is driven from the shaft 358 by means of the small sprocket pinion 382.

In place of the pneumatic conveyer for removing the husks which I provided in the machine of my former patent, I have substituted a belt 383, which is best seen in Figs. 3 and 10, and which extends the entire length of the machine, being carried by the wide pulleys 384 and 385, which are secured upon the shafts 386 and 387 journaled in the bearing brackets 388 and 389 supported from the transverse sills 62 and 60, respectively. The shaft 386 has secured on one end thereof the sprocket wheel 390, which, through the medium of the sprocket chain 391 and the sprocket wheel 392, is driven from the shaft 358, as will be clearly apparent from Fig. 2. By means of this belt, the husks and silks are carried to the end of the machine, where they may be delivered to any point that may be desired. To deflect the husks and silks upon this belt, I provide the metallic sheathing 393, which is secured to the standards 71, 72 and 73, and extends from either side of the belt upward to the position where it is necessary to receive husks and silks as they are removed from the ears.

By the invention above described, it will be apparent that I have produced a machine by which the husks may be rapidly removed from the ears of green corn, and one that is entirely automatic in its work throughout, the only attention necessary being to feed the ears to the machine.

While I have shown and described my invention as embodied in the form which I at present consider best adapted to carry out its purposes, it will be understood that it is capable of numerous modifications, and that I do not desire to be limited in the interpretation of the following claims except as may be necessitated by the state of the prior art.

What I claim as new and desire to secure by Letters Patent of the United States, is,—

1. In a device of the class described, the combination with the secondary conveyer having spikes thereon, of the primary conveyer, the framework upon which said conveyers are mounted, and a member carried by the frame for drilling a hole centrally in the end of the cob for the reception of the spikes as the ear is presented thereto by the primary conveyer.

2. In a device of the class described, the combination with the secondary conveyer having spikes thereon, of the framework, the primary conveyer, and devices having a common actuating means carried by the frame which simultaneously drill a hole centrally in the end of the cob for the reception of the spike and simultaneously score the husks at the butt as the ear is presented thereto by the primary conveyer.

3. In a device of the class described, combination with the conveyer for carrying the ears longitudinally, of the four brushes movable radially of the path of the ear and shaped so as to form a flaring aperture into which the tip of the ear is carried.

4. In a device of the class described, the combination with the conveyer having means for moving the ears longitudinally, of the rotating cylindrical brushes coöperating therewith and having their axes transverse to the line of movement of the ears, and movable bearing spindles for said brushes which permit them to move to and from the line of movement of the ears to accommodate themselves to ears of different diameters.

5. In a device of the class described, the combination with the conveyer having means for moving the ears longitudinally, of the rotating cylindrical brushes coöperating therewith and having their axes transverse to the line of movement of the ears, movable bearing spindles for said brushes which permit them to move to and from the line of movement of the ears to accommodate themselves to ears of different diameters, and springs for holding them yieldingly toward the ears.

6. In a device of the class described, the combination with the conveyer having means for moving the ears longitudinally, of the rotating cylindrical brushes arranged in pairs and having their axes transverse to the line of movement of the ears, movable bearing spindles for said brushes which permit them to move to and from the line of movement of the ears to accommodate themselves to ears of different diameters, and springs for holding them yieldingly toward the ears.

7. In a device of the class described, the combination with the conveyer having means for moving the ears longitudinally, of the rotating brushes coöperating therewith having the axes at right angles to the line of movement of the ears, and movable bearing spindles for said brushes which permit them to move to and from said line of movement to accommodate themselves to ears of different diameters.

8. In a device of the class described, the combination with the conveyer having means for moving the ears longitudinally, of the rotating brushes coöperating therewith having the axes at right angles to the line of movement of the ears, movable bearing spindles for said brushes which permit them to move to and from said line of movement to accommodate themselves to ears of different diameters, and springs for holding the brushes yieldingly against the ears.

9. In a device of the class described, the combination with the conveyer having means for moving the ears longitudinally, of the bearing bracket, the pair of parallel bearing sleeves pivoted in the bracket, springs connecting the sleeves, the spindles mounted in the bearings, the brushes at the ends of the spindles, and means for rotating the spindles.

10. In a device of the class described, the combination with the conveyer having means for moving the ears longitudinally, of the bearing bracket, the pair of parallel bearing sleeves pivoted in the bracket, springs connecting the sleeves, spindles mounted in the bearings, brushes at the ends of the spindles, and means for rotating the spindles, consisting of the shives on the ends thereof and the rope running over the shives.

11. In a device of the class described, the combination with the conveyer having means for moving the ears longitudinally, of the plurality of spindles arranged substantially radially to the line of movement of the ears, brushes carried by said spindles, the driving shive, the shives on the spindles, and the rope running over all of said shives.

12. In a device of the class described, the combination with the conveyer having means for moving the ears longitudinally, of the plurality of spindles arranged substantially radially to the line of movement of the ears, brushes carried by said spindles, the driving shive, the shives on the spindles, the tensioning shive, and the rope running over all of said shives.

13. In a device of the class described, the combination with the conveyer having means for moving the ears longitudinally, of the plurality of inclined spindles arranged substantially radially to the path of the ears, brushes carried by said spindles, the driving shive, the shives on the spindles, the guiding shive, and the rope coöperating with all of said shives.

14. In a device of the class described, the combination with the conveyer having means for moving the ears longitudinally, of the plurality of inclined spindles arranged substantially radially to the path of the ears, brushes carried by said spindles, the driving shive, the shives on the spindles, the guiding shive, the tensioning shive, and the rope coöperating with all of said shives.

15. In a device of the class described, the combination with the conveyer having means for moving the ears longitudinally, of the plurality of spindles arranged in sets on opposite sides of the machine, the two driving shives, a single shaft carrying said shives, the shives on the spindles, a pair of ropes coöperating with the driving shives and all the shives on the spindles on their respective sides of the machine, and means for rotating the shaft.

In witness whereof, I have hereunto set my hand and affixed my seal this 15th day of December A. D. 1906.

GEORGE WEISS. [L. S.]

Witnesses:
  JOHN H. McELROY,
  M. S. REEDER.

---

Copies of this patent may be obtained for five cents each, by addressing the "Commissioner of Patents, Washington, D. C."